(12) United States Patent
Chiang et al.

(10) Patent No.: US 10,231,275 B2
(45) Date of Patent: Mar. 12, 2019

(54) LAST COME, FIRST SERVED TREATMENT OF COMMUNICATION SESSION REQUESTS

(71) Applicant: T-Mobile USA, Inc., Bellevue, WA (US)

(72) Inventors: Hsin-Fu Henry Chiang, Bellevue, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 142 days.

(21) Appl. No.: 15/287,565

(22) Filed: Oct. 6, 2016

(65) Prior Publication Data

US 2018/0103497 A1    Apr. 12, 2018

(51) Int. Cl.
| | |
|---|---|
| *H04W 4/00* | (2018.01) |
| *H04W 76/15* | (2018.01) |
| *H04W 76/18* | (2018.01) |
| *H04W 76/38* | (2018.01) |
| *H04W 76/11* | (2018.01) |
| *H04W 76/16* | (2018.01) |
| *H04L 29/06* | (2006.01) |
| *H04W 76/34* | (2018.01) |
| *H04W 76/12* | (2018.01) |

(52) U.S. Cl.
CPC ............ *H04W 76/15* (2018.02); *H04W 76/11* (2018.02); *H04W 76/16* (2018.02); *H04W 76/18* (2018.02); *H04W 76/38* (2018.02); *H04L 65/1006* (2013.01); *H04L 65/1016* (2013.01); *H04L 65/1069* (2013.01); *H04W 76/12* (2018.02); *H04W 76/34* (2018.02)

(58) Field of Classification Search
CPC ..... H04W 76/15; H04W 76/38; H04W 76/18; H04W 76/11; H04W 76/025; H04W 76/021; H04W 76/068; H04W 76/027; H04W 84/042; H04L 65/1006; H04L 65/1016; H04L 65/1069
USPC ......................................................... 370/329
See application file for complete search history.

(56) References Cited

U.S. PATENT DOCUMENTS

| | | | |
|---|---|---|---|
| 8,605,869 B1 * | 12/2013 | Mobarak ........... | H04M 3/42289 370/260 |
| 2008/0298353 A1 * | 12/2008 | Zhu ....................... | H04W 76/15 370/356 |
| 2012/0083257 A1 | 4/2012 | Gentry et al. | |

(Continued)

OTHER PUBLICATIONS

PCT Search Report and Written Opinion dated Jan. 4, 2018 for PCT Application No. PCT/US17/53297, 15 pages.

*Primary Examiner* — Mang Hang Yeung
(74) *Attorney, Agent, or Firm* — Lee & Hayes, P.C.

(57) ABSTRACT

Multiple communication session requests received by a terminating UE within a period of time can be handled on a last come, first served basis. A terminating UE that is in the process of setting up a first communication session, upon receiving a session request to establish a second communication session, is configured to terminate first setup procedures for the first communication session, and initiate second setup procedures to establish the second communication session. The last come, first served treatment of a subsequent communication session can be implemented unconditionally, or selectively by evaluating whether a condition is met prior to accepting the subsequent communication session before finishing setup procedures for the initial communication session.

10 Claims, 4 Drawing Sheets

(56) References Cited

U.S. PATENT DOCUMENTS

| | | | |
|---|---|---|---|
| 2013/0028196 A1* | 1/2013 | Zou | H04W 8/20 370/328 |
| 2014/0293961 A1 | 10/2014 | Khay-Ibbat et al. | |
| 2015/0092533 A1 | 4/2015 | Biage et al. | |
| 2016/0174188 A1 | 6/2016 | Kim et al. | |

* cited by examiner

LAST COME, FIRST SERVED TREATMENT OF COMMUNICATION SESSION REQUESTS

BACKGROUND

The 3$^{rd}$ Generation Partnership Project (3GPP) standard defines procedures for user equipment (UE) to handle multiple incoming calls in particular scenarios. One scenario involves receiving a second call at a terminating UE while a first call previously received by the terminating UE is still being setup. In this scenario, the 3GPP standard defines a "first come, first served" approach for handling the second call during the setup of the first call. Following the first come, first served approach, when the second call is received during the setup of the first call, the terminating UE rejects the second call and attempts to finish the setup of the first call. This is a fair and sensible approach if the second call was truly originated by a different calling party than the calling party that originated the first, initial call.

However, it is often the case that the same calling party originated both the first and second calls. This can occur for various reasons, but perhaps most often, the second call is "re-attempted" via a different call path (e.g., using circuit switched (CS) fallback procedures) because of an issue that arose while attempting to establish the first call via an initial call path (e.g., poor radio coverage using a preferred network). In this example scenario, the originating UE may request to terminate the session setup of the first call by sending a Session Initiation Protocol (SIP) message using the SIP CANCEL method. Sending SIP CANCEL message from the originating UE is a best effort procedure that is not guaranteed to successfully terminate the setup of the first call because the SIP CANCEL message can be lost due to the same problems (e.g., poor radio coverage) that caused the issue with establishing the first call in the first place. Accordingly, before receiving a CANCEL response at the originating UE, the originating UE can send a second session request via the legacy (CS) network as part of the CS fallback procedure. Because automated re-attempt procedures, such as CS fallback, occur vary rapidly, a second call from the same calling party can be received by the terminating UE within a relatively short time period (e.g., within about 5 to 20 seconds) from the time a first call was received, and, when the second call is received, the setup procedures for the first call may still be ongoing. In this scenario, the first come, first served approach can be detrimental to successful call establishment because the second call—despite often having a higher chance of success than the first call—is rejected by the terminating UE in preference of finishing the setup procedures for the first call. If establishment of the first call fails, the parties to the would-be communication session are not connected, resulting in a poor call experience.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
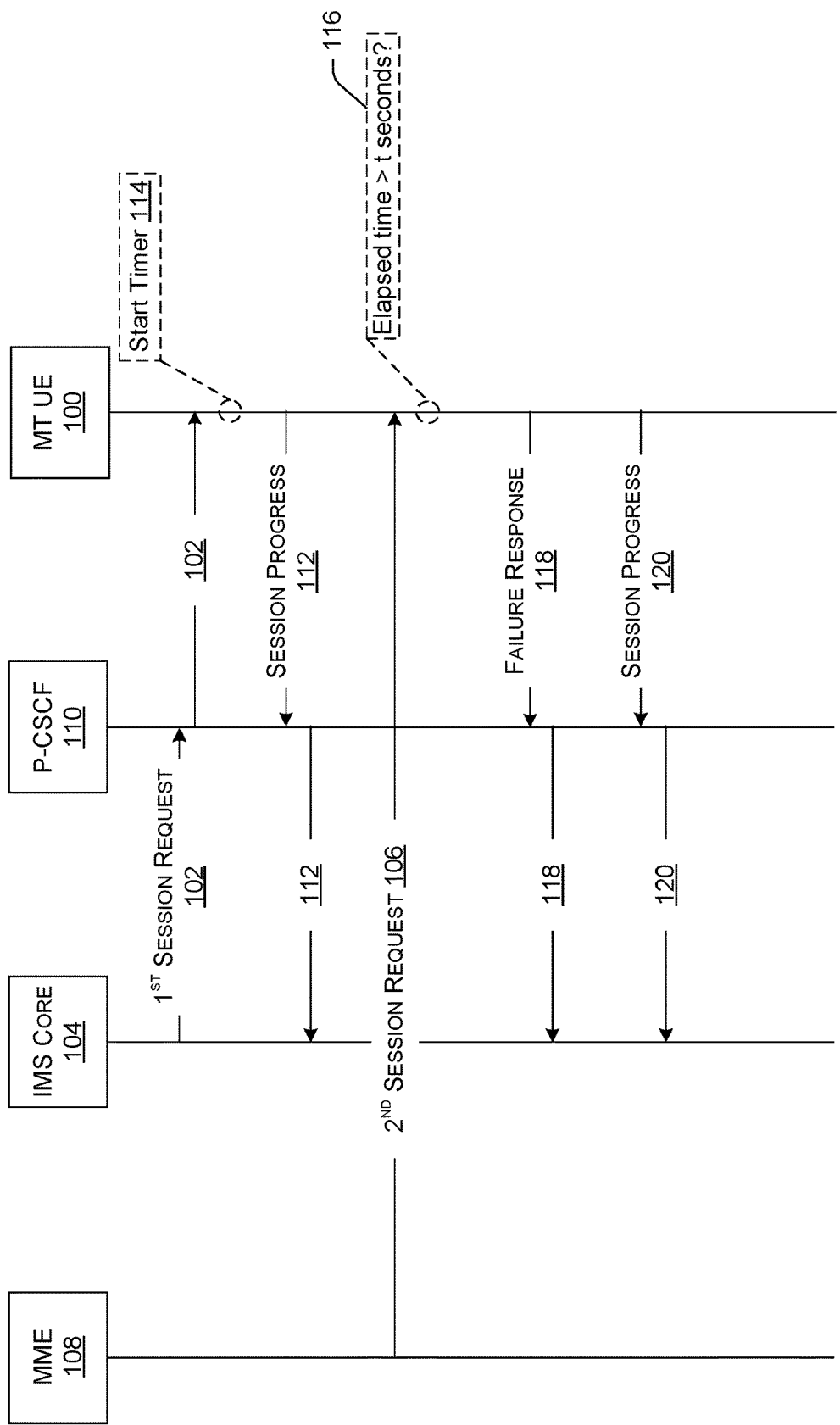
FIG. 1 is a diagram illustrating example signaling between a terminating UE and various network nodes when the terminating UE receives multiple requests to establish multiple corresponding communication sessions within a period of time, FIG. 1 further illustrating that the terminating UE is configured to implement an example last come, first served approach for handling the multiple requests.

Described herein are techniques and systems for last come, first served treatment of communication session requests by a terminating UE. Accordingly, a terminating UE that is currently in the process of setting up a first communication session, upon receiving a session request to establish a second communication session, is configured to terminate first setup procedures for the first communication session, and initiate second setup procedures to establish the second communication session. In some embodiments, this last come, first served treatment of a subsequent communication session is implemented unconditionally by the terminating UE (i.e., a subsequent communication session is always accepted in lieu of finishing setup procedures for an initial communication session). In some embodiments, the terminating UE is configured implement the last come, first served treatment selectively (or conditionally) by evaluating whether a condition is met prior to terminating the first setup procedures for the first communication session, and initiating the second setup procedures to establish the second communication session. In this conditional implementation of the last come, first served session handling approach, when the condition(s) is not met, the terminating UE can revert to a first come, first served session handling approach for handling the subsequent communication session by rejecting the second communication session request and finishing the first setup procedures for the first communication session.

Accordingly, a process to be implemented by a terminating UE can include receiving a first session request to establish a first communication session with the terminating UE, and initiating first setup procedures to establish the first communication session. Prior to establishing the first communication session, the terminating UE can receive a second session request to establish a second communication session with the terminating UE. In response to receiving the second session request, the terminating UE can terminate the first setup procedures for the first communication session, and initiate second setup procedures to establish the second communication session. In this manner, the second communication session request that is received during the setup of the first communication session is handled on a last come, first served basis by terminating the first setup procedures for the first communication session upon receipt of the second communication session request, and initiating the second setup procedures to establish the second communication session.

Also disclosed herein are systems and devices comprising one or more processors and one or more memories, as well as non-transitory computer-readable media storing computer-executable instructions that, when executed, by one or more processors perform various acts and/or processes disclosed herein.

Because a second communication session request that is received while a first communication session is still being setup is often originated by the same originating party that originated the first communication session, handling the second communication session request on a last come, first served basis increases the likelihood that a communication session will be successfully established between the originating party (who likely originated both of the first and the second communication sessions) and a terminating party associated with the terminating UE. The result is an improved session experience from the perspective of the users/parties associated with the UEs on either side of the communication session.

In view of the possibility that the second communication session request was originated by a different originating party than the originating party of the first communication session, the terminating UE is configured to selectively implement the last come, first served treatment of the second communication session request. This selective (or conditional) implementation of the last come, first served treatment of the second communication session request can allow for utilization of the last come, first served session handling approach at times where it is most appropriate to accept a subsequent communication session request in lieu of finishing the setup of an initial communication session.

FIG. 1 is a diagram illustrating example signaling between a terminating UE 100 (designated as "MT UE" 100 in FIG. 1, "MT" meaning "mobile terminated" or "mobile terminating") and various network nodes. FIG. 1 illustrates a scenario where the terminating UE 100 receives a first session request 102 via an Internet Protocol Multimedia Subsystem (IMS) core 104, and a second session request 106 from a mobility management entity (MME) 108, the second session request 106 being received within a relatively short period of time from receipt of the first session request 102 (i.e., while the setup of a first communication session associated with the first session request 102 is still ongoing).

In accordance with various embodiments described herein, the terms "user equipment (UE)," "wireless communication device," "wireless device," "communication device," "mobile device," and "client device," may be used interchangeably hereinto describe any UE (e.g., the terminating UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology. The terminating UE 100 may be implemented as any suitable type of computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like.

In general, a user can utilize the terminating UE 100 to communicate with other users and associated UEs via the IMS core 104 (sometimes referred to as the "IMS core network 104," the "IMS network 104," the "Core Network (CN) 104," or the "IM CN Subsystem 104"). The IMS core 104 is an architectural framework defined by 3GPP for delivering Internet Protocol (IP) multimedia to a UE, such as the terminating UE 100. The IMS core 104 can be maintained and/or operated by one or more service providers, such as one or more wireless carriers ("operators"), that provide IMS-based services to users (sometimes called "subscribers") who are associated with UEs, such as the terminating UE 100. For example, a service provider may offer multimedia telephony services that allow a subscribed user to call or message other users via the IMS core 104 using his/her UE. A user can also utilize an associated UE to receive, provide, or otherwise interact with various different IMS-based services by accessing the IMS core 104. In this manner, an operator of the IMS core 104 may offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (i.e., a voice-based communication session, such as a VoLTE call).

The terminating UE 100 is configured to utilize various radio access networks (RANs) in order to access the IMS core 104. UEs that are fourth generation (4G) LTE-compliant are configured to communicate within heterogeneous cellular networks by employing radios that can communicate through LTE radio access technology (RAT) systems (or "LTE networks") as well as through legacy RAT systems (or "legacy networks"). Legacy networks, such as third generation (3G), and second generation (2G) networks, employ circuit-switching for voice communications, while LTE networks employ packet-switching for both data and voice communications in an all-IP data transport technology. Generally, 4G LTE-compliant UEs are configured to prefer attachment to 4G LTE RANs, which offer relatively high data-rate throughput as compared to available legacy RANs. In most UEs, a choice of which protocol to employ depends primarily on what RATs are available to the UE at the UE's present geographic location. Furthermore, in instances where the preferred 4G LTE RAT is unavailable or unusable for any reason, legacy RATs, if available, may be used as a fallback protocol, such as by using a circuit-switch fallback (CSFB) mechanism. The terminating UE 100 can comprise a UE with such capabilities to allow for communication over any type of RAT system/network.

Accordingly, in instances where a legacy RAT is available to the terminating UE 100, the terminating UE 100 can utilize a "combined attach" procedure where the terminating UE 100 performs registration for both a legacy (i.e., circuit-switch (non-LTE)) network and a LTE (i.e., packet-switched) network. By being "combined attached," the terminating UE 100 can implement fallback procedures to reattempt establishment of a communication session via a legacy network in the event that an LTE-based communication session (e.g., a VoLTE call) fails on the LTE network. A combined-attached UE will have established a radio link in order to transmit data to, and receive data from, the IMS core 104.

Before establishing a communication session, the terminating UE 100 can request registration for one or more IMS-based services provided via the IMS core 104. Registration of the terminating UE 100 can involve identifying a proxy call session control function (P-CSCF) node 110 and sending a registration request via a RAN (e.g., an LTE RAN) to the P-CSCF node 110. Although FIG. 1 depicts the IMS core 104 and the P-CSCF node 110 as separate entities, it is to be appreciated that the P-CSCF node 110 can be part of the IMS core 104. As such, the IMS core 104 can represent remaining IMS nodes of the IMS core 104 outside of the P-CSCF node 110.

Session Initiation Protocol (SIP) may be used for transmitting messages, such as registration messages, communication session messages, and the like, to the IMS core 104 via the P-CSCF node 110, and for receiving messages therefrom. SIP is a signaling protocol that can be used to establish, modify, and terminate multimedia sessions (e.g., a multimedia telephony call) over packet networks, and to authenticate access to IMS-based services. As used herein, a "SIP request" is a message that is sent from a UE, such as the terminating UE 100, to the IMS core 104 using SIP protocol, and a "SIP response" is a message that is sent from the IMS core 104 to a UE, such as the terminating UE 100, using SIP protocol.

The IMS core 104 allows for peer-to-peer communications, as well as client-to-server communications over an IP-based network. Accordingly, the IMS core 104 can represent any type of SIP-based network that is configured to handle/process SIP signaling packets or messages. To establish a communication session, an originating UE (not shown) associated with an originating party (e.g., a calling party) can send the first session request 102 to the IMS core 104. The first session request 102 can comprise a SIP message using the SIP INVITE method to request that a first communication session be established with the terminating UE 100. The IMS core 104, upon receipt of the first session request 102, can forward the first session request 102 to the P-CSCF node 110 that is serving the terminating UE 100, and the P-CSCF node 110 can forward the first session request 102 to the terminating UE 100, as shown in FIG. 1. Accordingly, the terminating UE 100 receives the first session request 102 (e.g., in the form of a SIP INVITE) requesting to establish a first communication session with the terminating UE 100. For example, the first session request 102 comprise a SIP INVITE to request establishment of a voice call (e.g., a VoLTE call) between a terminating party associated with the terminating UE 100 and an originating party associated with an UE that originated the first session request 102.

In response to receiving the first session request 102, the terminating UE 100 can initiate first setup procedures for establishing the first communication session. This is sometimes referred to herein as initiating a first session setup. The first setup procedures can comprise various actions and message transmissions by and between the terminating UE 100 and various network nodes of the IMS core 104. FIG. 1 illustrates a session progress message 112 (sometimes called a "183 response") transmitted by the terminating UE 100 to the IMS core 104 via the P-CSCF node 110. The session progress message 112 represents one of multiple first setup procedures that can be performed by the terminating UE 100 in response to receiving the first session request 102 at the terminating UE 100. Therefore, it is to be appreciated that the terminating UE 100 is configured to perform additional first setup procedures upon receiving the first session request 102, such as establishing, by the terminating UE 100, a radio resource control (RRC) connection with a preferred RAT (e.g., an LTE RAT), including a change request (CR) and cyclic redundancy check (CRC), establishing an evolved packet system (EPS) bearer, transmitting, by the terminating UE 100, various SIP messages, including a 100 Trying message (indicating the first session request 102 has been received at the terminating UE 100), a 180 Ringing message (indicating that a terminating party of the UE 100 is being alerted), an UPDATE message, various "ACK" message (e.g., a PRACK message), and so on. The terminating UE 100 is configured to transmit a final response a last step of the first setup procedures in order to resolve the setup of the first communication session. Such a final response can be in the form of a 2xx—successful (e.g., a 200 (OK) response indicating successful connection), 4xx—client failure, 5xx—server failure, or 6xx—global failure. The various actions taken and messages transmitted by the terminating UE 100 leading up to, and including, the final response constitute the first setup procedures for establishing the first communication session. FIG. 1 shows that the terminating UE 100 has initiated the first setup procedures by transmitting the session progress message 112 (which may or may not be an initial procedure of the first setup procedures). The first session setup is not complete unless and until the terminating UE 100 transmits a final response. Furthermore, the first communication session is not established unless and until the terminating UE 100 transmits a final response in the form of a 2xx response (e.g., 200 (OK)).

FIG. 1 also illustrates that the terminating UE 100 can be configured to start a timer 114 in response to receiving the first session request 102. The timer 114 is used to measure an elapsed period of time since the receipt of the first session request 102, as will be described in more detail below.

Prior to completing the setup of the first communication session, and therefore, prior to establishing the first communication session (e.g., prior to the terminating UE 100 transmitting a final response in the form of a 2xx response), the terminating UE 100 can receive the second session request 106. As an example, the second session request 106 can be received at the terminating UE 100 within about 5-20 seconds, seeing as how a typical session setup (i.e., completing setup procedures) can take on the order of 30 seconds, or longer, to complete (e.g., pursuant to 3GPP specification 24.229, the default value for completing setup procedures is 128 seconds because the Timer B formula is 64*T1, where T1 is set to 2 seconds by default for a value of 128 seconds). Accordingly, the example scenario illustrated in FIG. 1 is where the second session request 106 is received while the first communication session associated with the first session request 102 is still being setup (i.e., the first setup procedures are still ongoing).

The second session request 106 can be in the form of page request that is received from the MME 108 of an LTE network, where the MME 108 interfaces with a mobile switching center (MSC) of a legacy network (i.e., a CS network) to facilitate signal transmission between the legacy network and the LTE network. A page request is a notification message that indicates to the terminating UE 100 that a second communication session has been requested to be established on a legacy network (e.g., a 3G network, 2G network, etc.). Upon receiving the second session request 106 in the form of a page request, the terminating UE 100 does not know whether the second session request 106 was originated by the same originating party that originated the first session request 102 or by a different originating party. This is at least because there is no identifying information included in a page request for identifying the originating party associated with the page request.

However, it is possible that the originating party of the second session request 106 is the same originating party as the originating party of the first session request 102. There are various scenarios that can play out for this to happen. For example, an originating party (e.g., "User A") may have attempted the first communication session by an originating UE sending the first session request 102 via an available LTE network (e.g., a VoLTE call, VoWiFi call, etc.), but an issue may have arose that prolonged, or prevented completion of, the setup of the first communication session (e.g., SIP messages dropped due to poor coverage in a particular geographic location, failure to establish a dedicated bearer, etc.), which may trigger (due to a call setup timer expiring on the originating UE) fallback procedures (e.g., CS fallback) at the originating UE. Fallback procedures may trigger a reattempt of a second communication session over a legacy network to connect User A with a terminating party (e.g., "User B"). In this example scenario, the originating UE may request to terminate the session setup of the first communication session by sending a SIP message using the SIP CANCEL method. Before receiving a CANCEL response at the originating UE, however, the originating UE can send the second session request 106 via the legacy (CS) network as part of a CS fallback procedure, and the terminating UE 100 receives the second session request 106 in the form of a page request from the MME 108 while the first setup procedures for the first communication session are still ongoing.

Another example scenario that may cause the second session request 106 to be transmitted on behalf of the same originating party is when the originating party (User A) attempts the first communication session by an originating UE sending the first session request 102 via an available LTE network (e.g., a VoLTE call, VoWiFi call, etc.), but the IMS core 104 may have not received a response from the terminating UE 100 due to poor LTE network coverage in the geographic location of the terminating UE 100. In this scenario, the IMS core 104 may have reattempted to establish the second communication session over a legacy network due to the failure to receive an appropriate response from the terminating UE 100, which causes transmission of the second session request 106 from the MME 108 to the terminating UE 100 while the first setup procedures for the first communication session are still ongoing. In this network CS retry scenario, the network reattempts to connect User A with User B by invoking a fallback procedure via the MME 108, rather than the originating UE making the reattempt via a fallback procedure, as in the first example scenario. In either example scenario, the terminating UE 100 receives the second session request 106 while the first setup procedures of the first communication session are still in progress, and possibly before the terminating UE 100 even has a chance to invoke fallback procedures itself, such as a CS retry procedure where the terminating UE 100 would send a SIP message using the SIP CANCEL method to terminate the first session setup and begin reattempting another communication session via a legacy network.

In response to receiving the second session request 106 while the first setup procedures for the first communication session are still ongoing, the terminating UE 100 is configured to check the timer 114 to determine whether an elapsed period of time measured from the start of the timer (i.e., the time of receiving the first session request 102 at the terminating UE 100) to receipt of the second session request 106 is greater than a predetermined time period. This checking of the timer 114 is shown by the box 116 in FIG. 1. The predetermined time period evaluated at 116 is configurable such that the predetermined time period can be set to any suitable value measured in any suitable unit of measurement (e.g., seconds, milliseconds, etc.). In some embodiments, the predetermined time period (shown as "t seconds" in box 116) can be about 5 seconds. If the terminating UE 100 determines that the elapsed time since the start of the timer 114 is greater than the predetermined time period (e.g., greater than about 5 seconds), the terminating UE 100 can invoke last come, first served logic by terminating the first setup procedures for the first communication session (associated with the first session request 102), and initiating second setup procedures to establish a second communication session associated with the second session request 106.

In addition to stopping all further setup procedures, termination of the first setup procedures for the first communication session can comprise transmitting, by the terminating UE 100, a failure response 118 to the IMS core 104 via the P-CSCF node 110. The failure response 118 indicates that the first setup procedures have been stopped. The failure response 118 can comprise a 5xx response, such as a 580 precondition failure response during a pre-alerting phase, a 504 server timeout response during an alerting phase, and so on.

Initiating the second setup procedures to establish the second communication session (associated with the second session request 106) can comprise various actions and message transmissions by and between the terminating UE 100 and various network nodes of the IMS core 104, similar to, or the same as, the actions and message transmissions described above with respect to the first setup procedures. For example, the terminating UE 100 can initiate the second setup procedures by transmitting another session progress message 120 (e.g., a "183 response") to the IMS core 104 via the P-CSCF node 110. Upon completion of the second setup procedures for the second communication session, the terminating UE 100 is configured to establish the second communication session over a legacy (CS) network (e.g., a 3G network, 2G network, etc.).

Use of the timer 114 is an example of selective (or conditional) implementation of the last come, first served session handling approach upon receipt of the second session request 106. That is, terminating the first setup procedures for the first communication session (e.g., sending the failure response 118) and initiating the second setup procedures for the second communication session (e.g., sending the session progress message 120) are conditioned on determining that the elapsed period of time since the start of the timer 114 is greater than the predetermined time period. This is useful in the scenario of FIG. 1 where the second session request 106 is received at the terminating UE 100 in the form of a page request with no identifying information to identify the originating party of the second session request 106. If the check of the timer at 116 results in a determination that the elapsed period of time since the start of the timer 114 does not exceed the predetermined time period (e.g., about 5 seconds), then the terminating UE 100 can instead reject the second session request 106 and finish the first setup procedures for the first communication session on a first come, first served basis.

It is to be appreciated that use of the timer 114 for conditional implementation of the last come, first served session handling approach is purely optional. In other words, starting the timer 114 and checking the elapsed time at 116 can be omitted from the signal flow of FIG. 1 and the last come, first served logic can be implemented by the terminating UE 100 unconditionally in response to receiving the second session request 106 while the first session setup is still ongoing. With unconditional implementation of the last come, first served session handling technique, the first session setup is always terminated in lieu of initiating setup of the second communication session associated with the second session request 106.

Figure 2:
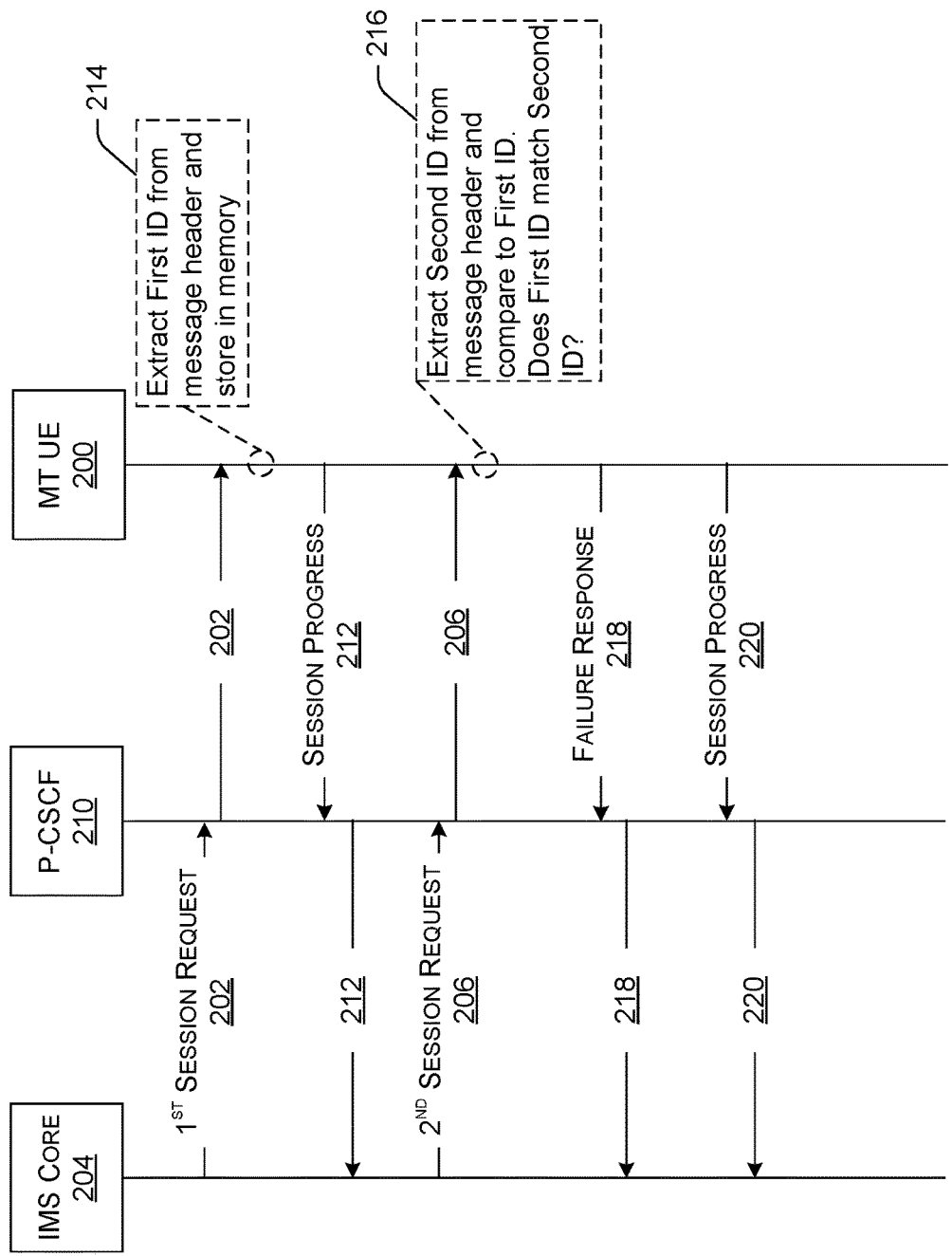
FIG. 2 is a diagram illustrating example signaling between a terminating UE and various network nodes when the terminating UE receives multiple requests to establish multiple corresponding communication sessions within a period of time, FIG. 2 further illustrating that the terminating UE is configured to implement another example last come, first served approach for handling the multiple requests.

FIG. 2 is a diagram illustrating example signaling between a terminating UE 200 and various network nodes when the terminating UE 200. FIG. 2 illustrates a scenario where the terminating UE 200 receives a first session request 202 via an IMS core 204, and a second session request 206 from the IMS core 204, the second session request 206 being received within a relatively short period of time from receipt of the first session request 202 (i.e., while the setup of a first communication session associated with the first session request 202 is still ongoing).

FIG. 2 includes a P-CSCF node 210 that is assigned to serve the terminating UE 200 during registration of the terminating UE 200 for one or more IMS-based services. The initial attachment (e.g., combined attached) procedures and registration procedures can be similar to those described above with reference to FIG. 1. Furthermore, the first session request 202 can be in the form of a SIP message using the SIP INVITE method, similar to the first session request 102 of FIG. 1, and the initiation of the first setup procedures for a first communication session associated with the first session request 202 can be similar to the first setup procedures described with reference to FIG. 1. For example, in response to receiving the first session request 202, the terminating UE 100 can be configured to initiate first setup procedures for the first communication session by transmitting a session progress message 212 to the IMS core 204, similar to the transmission of the session progress message 112 described with reference to FIG. 1.

However, where the example scenario of FIG. 2 differs from the example scenario of FIG. 1 is that, in response to receiving the first session request 202, the terminating UE 100 is further configured to determine, at block 214, a first identifier associated with an originating party of the first communication session by extracting the first identifier from a message header (e.g., a SIP header), and the terminating UE 100 can store the first identifier in memory of the terminating UE 100 for later reference. A SIP message header can specify various pieces of information included in different header fields. At least one piece of information included in the SIP message header comprises an identifier of the originating party of the first session request 102. The first identifier can be in the form of a unique identifier number, or any other suitable identifier (e.g., alphanumeric, a name, etc.) that uniquely identifies the originating party of the first session request 102.

Another difference between the scenarios of FIGS. 1 and 2 is that, in the scenario of FIG. 2, the second session request 206 is received from the IMS core 204 to establish a second communication session on an LTE network. Accordingly, the second session request 206 of FIG. 2 can comprise a SIP message using the SIP INVITE method, similar to the first session request 202. Accordingly, in response to receiving the second session request 206 (e.g., a second SIP INVITE), the terminating UE 100 can determine, at block 216, a second identifier associated with an originating party of the second communication session by extracting the second identifier from a message header (e.g., a SIP header) of the second session request 206. The terminating UE 100, at block 216, can also compare the first identifier to the second identifier to determine if the identifiers match. Matching identifiers in the two session requests 202 and 206 indicates that the originating party of the first communication session is a same party as the originating party of the second communication session. If the first identifier from the first session request 202 matches the second identifier from the second session request 206, the terminating UE 100 can implement the last come, first served logic to terminate the first setup procedures for the first communication session (e.g., by transmitting a failure response 218), and to initiate second setup procedures for the second communication session (e.g., by transmitting a session progress message 220). The operations for implementing the last come, first served logic in the example scenario of FIG. 2 can be similar to the operations described above with reference to FIG. 1.

Comparing the first identifier to the second identifier to determine whether to implement the last come, first served logic at the terminating UE 100 is another example of a conditional implementation of the last come, first served session handling approach for the second session request 206. Accordingly, if the first identifier does not match the second identifier, indicating that the originating party of the first session request 202 is different than the originating party of the second session request 206, the terminating UE 100 can implement a first come, first served session handling technique by rejecting the second session request 206, and finishing the first setup procedures for the first communication session (associated with the first session request 202). Again, it is to be appreciated that the extraction and comparison of the first identifier and the second identifier is purely optional, and the terminating UE 100 can unconditionally implement the last come, first served session handling approach upon receiving the second session request 206 without comparing the identifiers.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
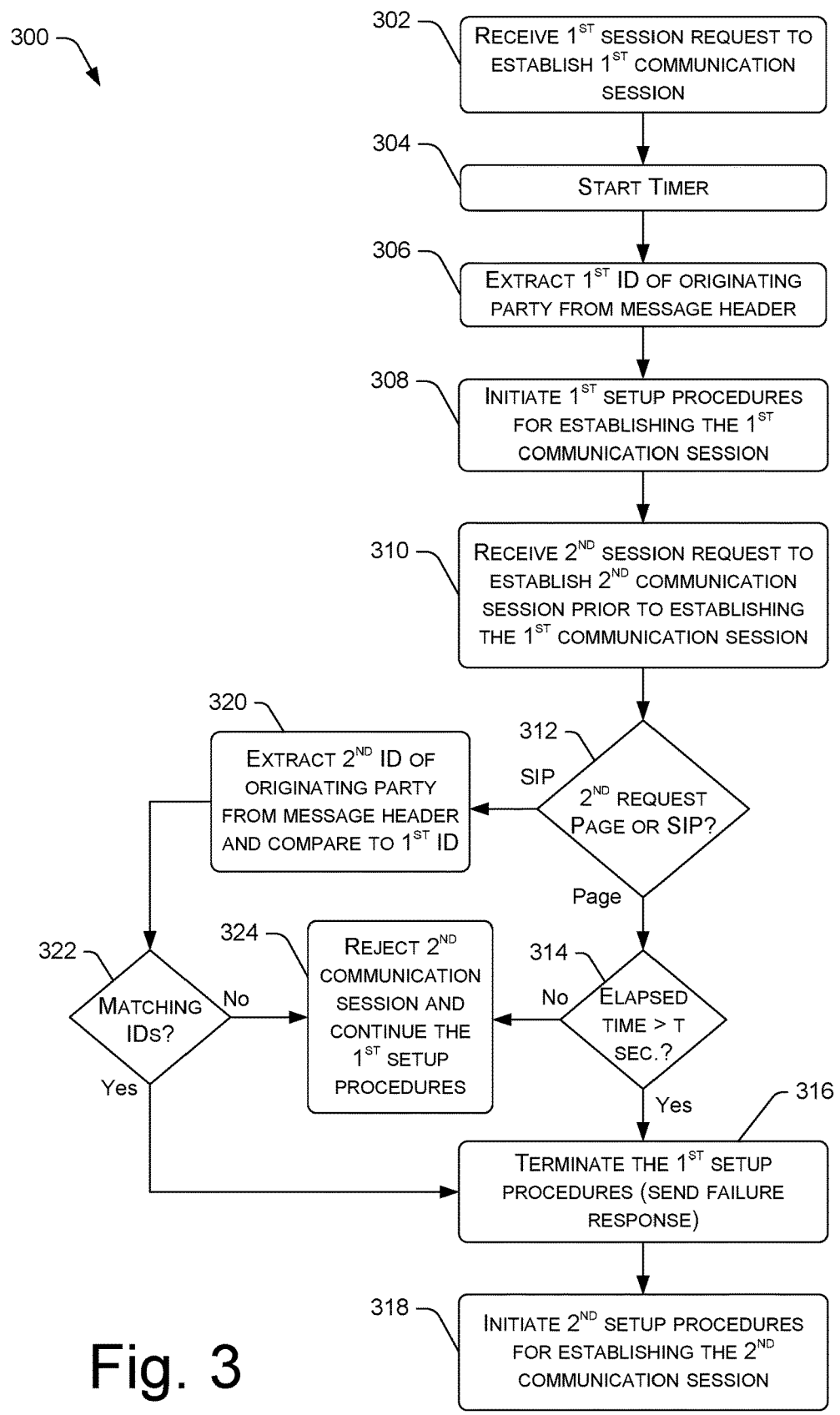
FIG. 3 illustrates a flowchart of an example process for handling a second communication session request during a setup of a first communication session based on a last come, first served approach.

FIG. 3 illustrates a flowchart of an example process 300 for handling a second communication session request during a setup of a first communication session based on a last come, first served approach.

At 302, the terminating UE 100, 200 can receive a first session request 102, 202 for establishing a first communication session with the terminating UE 100, 200. As described herein, the first session request 102, 202 can comprise a SIP message using the SIP INVITE method to request establishment of a communication session (e.g., a VoLTE call) on a LTE network. Furthermore, the first session request 102, 202 can be received an IMS node of the IMS core 104, 204, such as the P-CSCF node 110, 210, or a different IMS node of the IMS core 104, 204.

At 304, in response to receiving the first session request 102, 202 at 302, a timer can be started. The timer can be a local hardware or software timer that is started by the terminating UE 100, 200 at 304 (e.g., as shown by "start timer 114" in FIG. 1). Alternatively, a remote timer can be started at 304. For example, the IMS node that sent the first session request 102, 202 to the terminating UE 100 can initiate a remote timer at 304 in response to sending the first session request 102, 202 to the terminating UE 100 and/or in response to receiving confirmation from the terminating UE 100 that the first session request 102, 202 was received (e.g., via a 100 Trying response from the terminating UE 100).

At 306, the terminating UE 100, 200 can determine, by extracting from a message header (e.g., a SIP message header) of the first session request 102, 202, a first identifier associated with an originating party of the first communication session (e.g., as shown by box 214 in FIG. 2). Extraction of the first identifier from the message header at 306 can further comprise storing the first identifier in memory of the terminating UE 100, 200 (e.g., as shown by box 214 of FIG. 2). Storage of the first identifier in local memory of the terminating UE 100, 200 allows for accessing the first identifier at a later time, if necessary.

At 308, the terminating UE 100, 200 can initiate first setup procedures to establish a first communication session associated with the first session request 102, 202. The first setup procedures can comprise various actions and message transmissions by and between the terminating UE 100, 200 and various network nodes of the IMS core 104, 204, as described herein. For example, the terminating UE 100, 200 may transmit a session progress message 112, 212 (a "183 response") the IMS core 104, 204 via the P-CSCF node 110, 210. It is to be appreciated that the terminating UE 100, 200 can initiate the first setup procedures for the first communication session by transmitting any other suitable type of message (e.g., a 100 Trying message), or by taking any other suitable action locally on the terminating UE 100, 200 as a preceding setup procedure to the transmission of the session progress message 112, 212, and that the session progress message 112, 212 is merely an example of a procedure involved in the first session setup of the first communication session.

At 310, prior to establishing the first communication session (i.e., prior to the terminating UE 100, 200 transmitting a final response in the form of a 2xx response (e.g., 200 (OK) response) and/or prior to completing the first setup procedures (e.g., transmitting any type of final response, such as a 4xx, a 5xx, or a 6xx response), the terminating UE 100, 200 can receive a second session request to establish a second communication session with the terminating UE 100, 200. The second session request can comprise a page request received from the MME 108 to establish the second communication session on a legacy (CS) network (e.g., a 3G network, 2G network, etc.), as described with reference to the second session request 106 of FIG. 1. Alternatively, the second session request can comprise a second SIP message (e.g., a second SIP INVITE) received from an IMS node of the IMS core 204 to establish the second communication session on an LTE network, as described with reference to the second session request 206 of FIG. 2.

At 312, a determination can be made as to whether the second session request is a page request or a SIP message. If the determination at 312 is that the second session request received at 310 is a page request received from the MME 108, as shown by the second session request 106 of FIG. 1, the process 300 can proceed to 314, where the timer started at 304 is checked to determine whether an elapsed period of time measured from the start of the timer to receipt of the second session request 106 is greater than a predetermined time period (e.g., about 5 seconds). FIG. 1 illustrates this timer check at box 116 in response to receiving the second session request 106. Checking the timer at 314 can comprise checking a local timer on the terminating UE 100, 200, or, when a remote timer is implemented, polling the IMS node that sent the first session request 102, 202 to the terminating UE 100, 200 for a value of the remote timer.

If it is determined at 314 that the elapsed time exceeds the predetermined time period, the process 300 follows the "yes" route from 314 to 316 where the terminating UE 100, 200 can terminate the first setup procedures for the first communication session. Terminating the first setup procedures (or terminating the first session setup) can comprise, in part, sending a failure response 118 to an IMS node of the IMS core 104, 204, such as the P-CSCF node 110, 210, the failure response 118 indicating that the first setup procedures have been stopped by the terminating UE 100, 200.

At 318, the terminating UE 100, 200 can initiate second setup procedures to establish the second communication session associated with the second session request 106, 206. Initiating the second setup procedures can involve similar operations, or the same operations, to those involved with initiating the first setup procedures for the first communication session at 308, such as sending a session progress message 120, 220 to the IMS core 104, 204 via the P-CSCF node 110, 210.

Returning to decision block 312, if the determination at 312 is that the second session request received at 310 is a second SIP message (e.g., a second SIP INVITE) received from an IMS node of the IMS core 104, 204, as shown by the second session request 206 of FIG. 2, the process 300 can proceed to 320, where the terminating UE 100, 200 can determine, by extracting from a message header (e.g., a SIP message header) of the second session request 206 a second identifier associated with an originating party of the second communication session (e.g., as shown by box 216 in FIG. 2). The second identifier can also be compared to the first identifier that was previously extracted from the message header of the first session request 102, 202 and stored in memory of the terminating UE 100, 200. Upon accessing the first identifier from memory of the terminating UE 100, 200 and comparing the first identifier to the second identifier extracted from the message header of the second session request, the process 300 can proceed to 322 where a determination is made as to whether the first identifier matches the second identifier. Matching identifiers at 322 indicates that the originating party of the first communication session is a same party as the originating party of the second communication session. If the identifiers don't match at 322, the originating party of the first communication session is different than the originating party of the second communication session.

Accordingly, if the first identifier matches the second identifier at 322, the process 300 follows the "yes" route from 322 to 316 where the last come, first served logic is implemented by the terminating UE 100, 200 at blocks 316 and 318. If, on the other hand, the first identifier does not match the second identifier at 322, the process 300 follows the "no" route from 322 to 324 where first come, first served logic is implemented by rejecting the second communication session and continuing the first setup procedures to resolve the first session setup. Using the "timer-based" conditional implementation of the last come, first served session handling approach, if at decision block 314, the elapsed time from the start of the timer at 304 to the time that the second session request 106 is received at 310 is less than the predetermined time period (e.g., about 5 seconds), the process 300 follows the "no" route from 314 to 324 where the first come, first served session handling approach is implemented.

Thus, the process 300 illustrates conditional implementation of a last come, first served session handling approach when a second session request 106, 206 is received prior to establishing the first communication session, or prior to finishing the first session setup for the first communication session (i.e., the first session setup is still ongoing when the second session request 106, 206 is received). However, as noted herein, the last come, first served session handling technique can be implemented by the terminating UE 100, 200 unconditionally as an alternative. For the unconditional implementation, the process 300 could be modified to steps 302, 308, 310, 316, and 318 without the optional steps involving the starting and checking of a timer, or the comparing of identifiers extracted from message headers in the received session requests.

Figure 4:
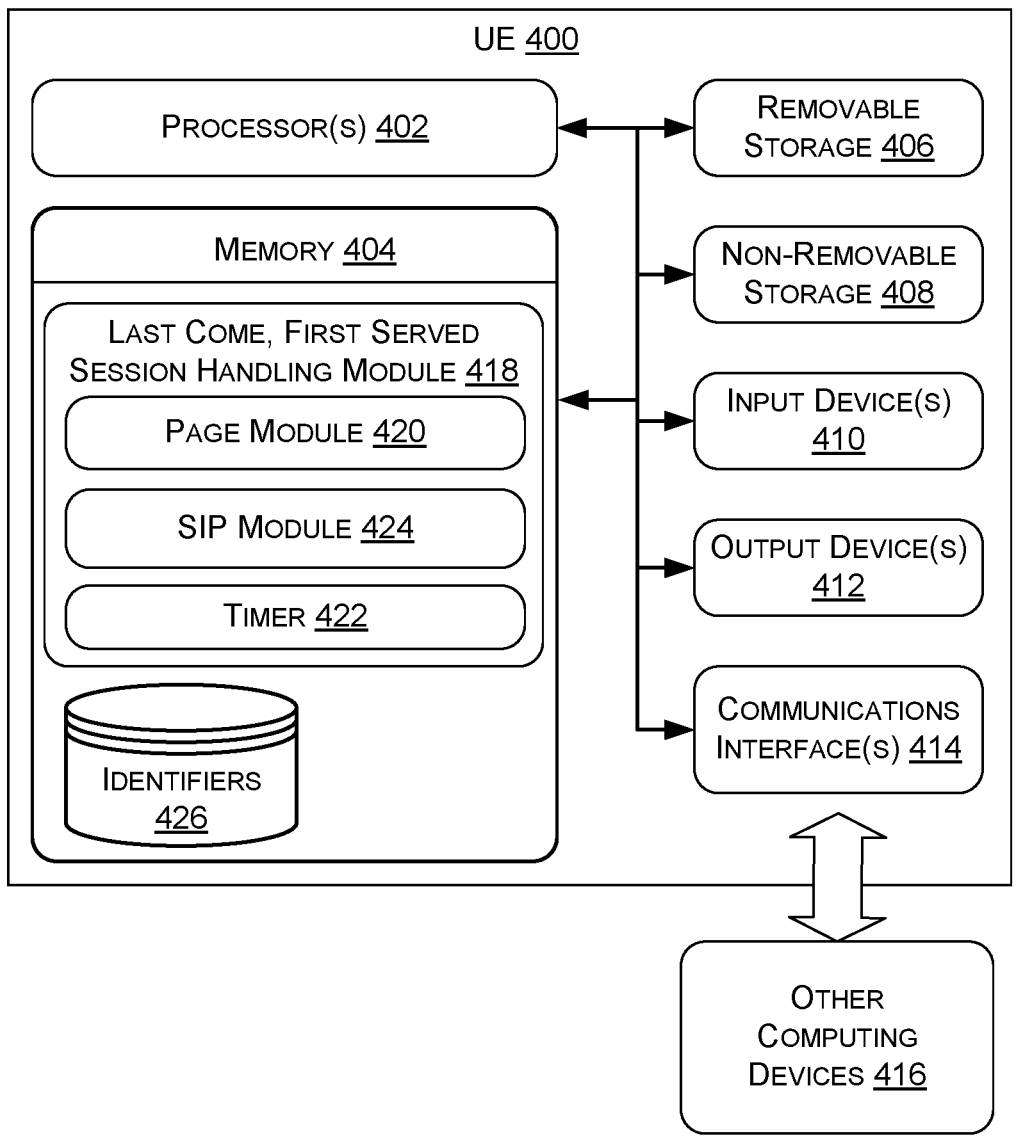
FIG. 4 is a block diagram of an example terminating UE with last come, first served session handling logic.

FIG. 4 is a block diagram of an example UE 400 with last come, first served session handling logic. The UE 400 may be representative of the terminating UE 100 of FIG. 1 and/or the terminating UE 200 of FIG. 2.

As shown, the UE 400 may include one or more processors 402 and one or more forms of computer-readable memory 404. The UE 400 may also include additional storage devices. Such additional storage may include removable storage 406 and/or non-removable storage 408.

The UE 400 may further include input devices 410 and output devices 412 communicatively coupled to the processor(s) 402 and the computer-readable memory 404. The UE 400 may further include communications interface(s) 414 that allow the UE 400 to communicate with other computing devices 416 (e.g., IMS nodes) such as via a network (e.g., the IMS core 104, 204). The communications interface(s) 414 may facilitate transmitting and receiving wired and/or wireless signals over any suitable communications/data technology, standard, or protocol, as described herein. For example, the communications interface(s) 414 can comprise one or more of a cellular radio, a wireless (e.g., IEEE 802.1x-based) interface, a Bluetooth® interface, and so on. In some embodiments, the communications interface(s) 414 may include radio frequency (RF) circuitry that allows the UE 400 to transition between different RATs, such as transitioning between communication with a 4G LTE RAT and a legacy RAT (e.g., 3G/2G). The communications interface(s) 414 may further enable the UE 400 to communicate over circuit-switch domains and/or packet-switch domains.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 400. Any such computer-readable storage media may be part of the UE 400.

The memory 404 can include a last come, first served session handling module 418 (i.e., computer-executable instructions (or logic) that, when executed, by the processor(s) 402, perform the various acts and/or processes disclosed herein. For example, the last come, first served session handling module 418 can be configured to unconditionally implement a last come, first served session handling approach in instances where a second session request 106, 206 is received during session setup of a first communication session, as described herein.

Alternatively, the last come, first served session handling module 418 can comprise a page module 420 configured utilize a timer 422 for conditional implementation of the last come, first served session handling approach when the second session request 106 is in the form of a page request from the MME 108 to establish the second communication session on a legacy network. Accordingly, the last come, first served session handling module 418 can start the timer 422 upon receiving a first session request 102, 202, and a value of the timer 422 can be checked by the page module 420 in response to determining that a received second session request 106 is a page request from the MME 108, as described herein. Although the timer 422 is depicted as a local software timer of the UE 400, a local hardware timer can be used as an alternative to the software timer 422, and/or a remote timer can be utilized for conditional implementation of the last come, first served session handling approach where the UE 400 is configured to poll an IMS node of the IMS core 104, 204 for a value of the remote timer in response to receiving the second session request 106 comprising a page request.

The last come, first served session handling module 418 can further include a SIP module 424 configured to utilize identifiers extracted from message headers of the session requests 202, 206 for conditional implementation of the last come, first served session handling approach when the second session request 206 is in the form of a second SIP message (e.g., a second SIP INVITE) from an IMS node of the IMS core 204 to establish the second communication session on a LTE network. Accordingly, the SIP module 424 is configured to extract identifiers from initial session requests 202 and to store the extracted identifiers 426 in the memory 404 of the UE 400 for later access in response to receipt of a second session request 206. The SIP module 424 is further configured to access a stored first identifier and to compare the first identifier to a second identifier extracted from a message header of a second session request 206 to determine if the identifiers match.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A device comprising:
a processor; and
memory storing computer-executable instructions that, when executed by the processor, cause the device to:
    initiate, in response to receipt of a first session request to establish a first communication session with the device, first setup procedures to establish the first communication session; and
    prior to establishing the first communication session, and in response to receipt of a second session request to establish a second communication session with the device:
        terminate the first setup procedures for the first communication session; and
        initiate second setup procedures to establish the second communication session,
wherein first session request comprises a Session Initiation Protocol (SIP) message to establish the first communication session on a primary network, and the second session request comprises a page request to establish the second communication session on a legacy network.

2. The device of claim 1, the computer-executable instructions further causing the device to:
in response to receiving the first session request, start a timer; and
in response to receiving the second session request, determine that an elapsed period of time measured from the start of the timer to receipt of the second session request is greater than a predetermined time period,
wherein terminating the first setup procedures and initiating the second setup procedures are conditioned on determining that the elapsed period of time is greater than the predetermined time period.

3. The device of claim 1, wherein terminating the first setup procedures for the first communication session comprises sending a failure response to an Internet Protocol Multimedia Subsystem (IMS) node.

4. A method comprising:
receiving, by a terminating user equipment (UE), a first session request to establish a first communication session with the terminating UE;
initiating, by the terminating UE, first setup procedures to establish the first communication session; and
prior to establishing the first communication session:
    receiving, by the terminating UE, a second session request to establish a second communication session with the terminating UE;
    sending, by the terminating UE, a response indicating that the first setup procedures have been stopped; and
    initiating, by the terminating UE, second setup procedures to establish the second communication session,
wherein the first session request is received from an Internet Protocol Multimedia Subsystem (IMS) node to establish the first communication session on a primary network, and the second session request is received from a node of the primary network to establish the second communication session on a legacy network.

5. The method of claim 4, further comprising:
in response to receiving the second session request, determining, by the terminating UE, that an elapsed period of time measured from receipt of the first session request to receipt of the second session request is greater than a predetermined time period,
wherein sending the response indicating that the first setup procedures have been stopped and initiating the second setup procedures are conditioned on determining that the elapsed period of time is greater than the predetermined time period.

6. The method of claim 5, wherein determining that the elapsed period of time is greater than the predetermined time period comprises polling the IMS node for a value of a timer that was initiated by the IMS node in response to sending the first session request to the terminating UE.

7. A method comprising:
receiving, by a terminating user equipment (UE), a Session Initiation Protocol (SIP) message for establishing a first communication session with the terminating UE, wherein the SIP message comprises a first SIP message;
in response to receiving the first SIP message, determining, from a message header of the first SIP message, a first identifier associated with an originating party of the first communication session;
storing the first identifier in memory of the terminating UE;
initiating a first session setup, by the terminating UE, for the first communication session; and
prior to completing the first session setup for the first communication session:
    receiving, by the terminating UE, a notification message for establishing a second communication session with the terminating UE, wherein the notification message comprises a second SIP message for establishing the second communication session;
    in response to receiving the second SIP message, determining, from a message header of the second SIP message, a second identifier associated with an originating party of the second communication session;
    accessing the first identifier from the memory;
    determining that the first identifier matches the second identifier indicating that the originating party of the first communication session is a same party as the originating party of the second communication session;

terminating, by the terminating UE, the first session setup, wherein terminating the first session setup and initiating the second session setup are conditioned on determining that the first identifier matches the second identifier; and initiating, by the terminating UE, a second session setup to establish the second communication session.

8. The method of claim 7, further comprising:

in response to receiving the notification message, determining, by the terminating UE, that an elapsed period of time measured from receipt of the SIP message to receipt of the notification message is greater than a predetermined time period, wherein terminating the first session setup and initiating the second session setup are conditioned on determining that the elapsed period of time is greater than the predetermined time period.

9. The method of claim 8, wherein determining that the elapsed period of time is greater than the predetermined time period comprises polling an Internet Protocol Multimedia Subsystem (IMS) node for a value of a timer that was initiated by the IMS node in response to sending the SIP message to the terminating UE.

10. The method of claim 8, further comprising starting, by the terminating UE, a timer in response to receiving the SIP message, wherein determining that the elapsed period of time is greater than the predetermined time period comprises checking the timer in response to receiving the notification message.

* * * * *